US012667197B2

(12) United States Patent
Wu et al.

(10) Patent No.: US 12,667,197 B2
(45) Date of Patent: Jun. 30, 2026

(54) ELECTRIC SOFA ANTI-PINCH SYSTEM AND ELECTRIC SOFA

(71) Applicant: DewertOkin Technology Group Co., Ltd., Jiaxing (CN)

(72) Inventors: Jiajun Wu, Jiaxing (CN); Du Jin, Jiaxing (CN); Kai Fang, Jiaxing (CN); Wei Wu, Jiaxing (CN); Qinyu Wan, Jiaxing (CN)

(73) Assignee: DewertOkin Technology Group Co., Ltd., Jiaxing (CN)

( * ) Notice: Subject to any disclaimer, the term of this patent is extended or adjusted under 35 U.S.C. 154(b) by 133 days.

(21) Appl. No.: 18/777,719

(22) Filed: Jul. 19, 2024

(65) Prior Publication Data

US 2026/0020682 A1     Jan. 22, 2026

(51) Int. Cl.
| | |
|---|---|
| *A47C 17/16* | (2006.01) |
| *A47C 7/50* | (2006.01) |
| *A61G 5/14* | (2006.01) |
| *G05B 19/406* | (2006.01) |

(52) U.S. Cl.
CPC ............ *A47C 17/162* (2013.01); *A47C 7/506* (2013.01); *G05B 19/406* (2013.01); *A61G 5/14* (2013.01); *G05B 2219/49159* (2013.01)

(58) Field of Classification Search
CPC ..... A47C 31/126; A47C 17/162; A47C 7/506; G05B 19/406; G05B 2219/49159; A61G 5/14
See application file for complete search history.

(56) References Cited

U.S. PATENT DOCUMENTS

| | | | |
|---|---|---|---|
| 2020/0383854 A1* | 12/2020 | Gehrke | A61B 5/725 |
| 2026/0020682 A1* | 1/2026 | Wu | A47C 17/162 |

FOREIGN PATENT DOCUMENTS

| | | | | |
|---|---|---|---|---|
| CN | 103029668 A | * | 4/2013 | |
| CN | 120096397 A | * | 6/2025 | B60N 2/002 |
| DE | 202016105266 U1 | * | 12/2017 | A47B 9/00 |

OTHER PUBLICATIONS

Trans. CN-103029668-A (Year: 2026).*
Trans. CN-120096397-A (Year: 2026).*
Trans. DE-202016105266-U1 (Year: 2026).*

* cited by examiner

*Primary Examiner* — J. T. Newton
(74) *Attorney, Agent, or Firm* — Birchwood IP

(57)     ABSTRACT

An electric sofa anti-pinch system and an electric sofa are provided. The electric sofa anti-pinch system includes a thin film pressure sensor, a drive module, and a control module. A triggering mechanism of the thin film pressure sensor is provided in a squeezing risk area of a moving part in the electric sofa; the thin film pressure sensor is configured to output a detection signal when the triggering mechanism is squeezed; the drive module is connected to the moving part and configured to drive the moving part to operate; the control module is respectively connected to the thin film pressure sensor and the drive module and configured to control the moving part to stop operating or reversely operate through the drive module when receiving the detection signal. Embodiments of the present disclosure can improve a reliability of the electric sofa anti-pinch system, enhance an anti-pinch effect.

19 Claims, 10 Drawing Sheets

ELECTRIC SOFA ANTI-PINCH SYSTEM AND ELECTRIC SOFA

TECHNICAL FIELD

The present disclosure relates to the field of smart furniture technologies, and in particular, to an electric sofa anti-pinch system and an electric sofa.

BACKGROUND

As smart furniture type in contemporary society, market share of electric sofas is increasing. If electric sofas get caught by people, animal, or other foreign object during operation, it can cause serious accidents, so the anti-pinch function of electric sofas is becoming increasingly important.

In related technologies, determining whether a foreign object that is caught is generally by installing an infrared pyroelectric sensor or a capacitive sensor, or by collecting parameters such as motor current and speed. However, infrared pyroelectric is greatly affected by the environment and is prone to misjudgment; the capacitive sensor is needed to be connected to the entire sofa frame, which is complex to install and can only be triggered when clamped to people and animal, and cannot identify a non-living foreign object; determining by motor current and speed can only be detected during the operation of the motor, which requires a large triggering force and a complex parameter processing process, it is easy to miss and misjudge. In summary, the existing electric sofas have poor anti-pinch effect and low reliability.

SUMMARY

The present disclosure provides an electric sofa anti-pinch system and an electric sofa to improve a reliability of the electric sofa anti-pinch system, enhance an anti-pinch effect, and improve a use safety of the electric sofa.

In a first aspect, an embodiment of the present disclosure provides an electric sofa anti-pinch system, including:

a thin film pressure sensor, where a triggering mechanism of the thin film pressure sensor is provided in a squeezing risk area of a moving part in the electric sofa; the thin film pressure sensor is configured to output a detection signal when the triggering mechanism is squeezed;

a drive module, connected to the moving part and configured to drive the moving part to operate;

a control module, which is respectively connected to the thin film pressure sensor and the drive module; the control module is configured to control the moving part to stop operating or reversely operate through the drive module when receiving the detection signal.

In an embodiment of the present disclosure, the electric sofa includes at least one moving part, the drive module includes at least one driving motor, and one driving motor is correspondingly connected to at least one moving part; the squeezing risk area of each moving part is corresponding provided with at least one thin film pressure sensor;

the control module is configured to control the moving part to stop operating or reversely operate through the driving motor connected to the moving part corresponding to the thin film pressure sensor when receiving the detection signal outputted from any one thin film pressure sensor.

In an embodiment of the present disclosure, the moving part includes a footrest; a squeezing risk area of the footrest is a back of the footrest;

the drive module includes a first driving motor connected to a leg driving component in the footrest.

In an embodiment of the present disclosure, the moving part further includes a lifting part, the lifting part includes a lifting driving component, a seat frame bracket, and two armrests; the seat frame bracket is connected between the two armrests, and the seat frame bracket is connected to the lifting driving component; a squeezing risk area of the lifting component includes a bottom surface of the seat frame bracket and bottom surfaces of the two armrests;

the first driving motor is further connected to the lifting driving component, or the drive module further includes a second driving motor connected to the lifting driving component.

In an embodiment of the present disclosure, the moving part further includes a backrest; a squeezing risk area of the backrest is a back of the backrest;

the first driving motor is further connected to a backrest driving component in the backrest; or the drive module further includes a third driving motor connected to the backrest driving component in the backrest.

In an embodiment of the present disclosure, the electric sofa further includes a chassis fixedly connected to one side of the lifting driving component away from the seat frame bracket;

the electric sofa anti-pinch system further includes:

at least one infrared sensor connected to the control module, a transmitting terminal and a receiving terminal of the infrared sensor are relatively provided on the chassis; when there is no foreign object on the chassis, there is no obstruction between the transmitting terminal and receiving terminal of the infrared sensor; the control module is further configured to control all moving parts to stop operating through the drive module when the receiving terminal of the at least one infrared sensor cannot receive an infrared signal.

In an embodiment of the present disclosure, the chassis includes two first support rods arranged in parallel and two second support rods connected between the two first support rods and arranged in parallel;

the at least one infrared sensor includes:

at least one first infrared sensor; a transmitting terminal and a receiving terminal of the first infrared sensor are relatively provided on the two first support rods;

and/or at least one second infrared sensor; a transmitting terminal and a receiving terminal of the second infrared sensor are relatively provided on the two second support rods.

In an embodiment of the present disclosure, the electric sofa anti-pinch system further includes an obstacle feedback module connected to the control module; the control module is further configured to control the obstacle feedback module to prompt a foreign object when the moving part is controlled to stop operating or reversely operate through the drive module; where the obstacle feedback module includes at least one of a buzzer, a vibrator, and an indicator light.

In an embodiment of the present disclosure, the obstacle feedback module includes the buzzer and a first transistor; one end of the buzzer is connected a first power signal, the other end of the buzzer is connected to a first pole of the first transistor, a control pole of the first transistor is connected to the control module, and a second pole of the first transistor is grounded.

In an embodiment of the present disclosure, the electric sofa anti-pinch system further includes a power module; the power module includes a power conversion chip, an input terminal of the power conversion chip is connected to a first power signal, a ground terminal of the power conversion chip is grounded, and an output terminal of the power conversion chip is connected to the control module;

and/or, the electric sofa anti-pinch system further includes a sensor detection module; the sensor detection module includes a first resistor, a second resistor, a third resistor, a first capacitor, and a first electrostatic protection diode; a first end of the first resistor is connected to an output terminal of the thin film pressure sensor or an output terminal of an infrared sensor, and a second end of the first resistor is respectively connected to a first end of the second resistor, a first end of the third resistor, and a first end of the first electrostatic protection diode; a second end of the second resistor is connected to a second power signal, and a second end of the third resistor is connected to the control module; a second end of the first electrostatic protection diode is grounded, and a first end of the first capacitor is connected to a second end of the third resistor, a second end of the first capacitor is grounded;

and/or, the electric sofa further includes a manual controller signal detection module; the manual controller signal detection module includes at least one button signal detection unit corresponding to at least one function button provided in a manual controller; the button signal detection unit includes a fourth resistor, a fifth resistor, a sixth resistor, a second capacitor, and a second electrostatic protection diode; a first end of the fourth resistor is connected to a function button corresponding to the button signal detection unit, and a second end of the fourth resistor is respectively connected to a first end of the fifth resistor, a first end of the sixth resistor, and a first end of the second electrostatic protection diode; a second end of the fifth resistor is connected to the control module, a second end of the sixth resistor is grounded, a second end of the second electrostatic protection diode is grounded, a first end of the second capacitor is connected to a second end of the fifth resistor, and a second end of the second capacitor is grounded.

In an embodiment of the present disclosure, the electric sofa anti-pinch system further includes a motor drive module corresponding one-to-one with the driving motor; the motor drive module includes a motor drive chip, an input terminal of the motor drive chip is connected to the control module, and an output terminal of the motor drive chip is connected to a driving motor corresponding to the motor drive module.

In an embodiment of the present disclosure, the electric sofa anti-pinch system further includes a current acquisition module corresponding one-to-one with the motor drive module; the current acquisition module includes a seventh resistor, an eighth resistor, and a third capacitor; a first end of the seventh resistor is connected to a ground terminal of the motor drive chip, a second end of the seventh resistor is grounded, a first end of the eighth resistor is connected to the ground terminal of the motor drive chip, a second end of the eighth resistor is respectively connected to a first end of the third capacitor and the control module, and a second end of the third capacitor is grounded.

In an embodiment of the present disclosure, one squeezing risk area is corresponding provided with one triggering mechanism of the thin film pressure sensor;

the triggering mechanism covers the squeezing risk area, the triggering mechanism is in a form of sheet, mesh, or grid; the triggering mechanism is configured to surround around an edge of the squeezing risk area, and the triggering mechanism is annular, U-shaped, or strip-shaped.

In an embodiment of the present disclosure, a pressure sensing sensitivity of the thin film pressure sensor is less than 0.1 N.

In a second aspect, an embodiment of the present disclosure further provides an electric sofa, including a moving part and the electric sofa anti-pinch system in the first aspect of the present disclosure.

In the electric sofa anti-pinch system provided by the embodiment of the present disclosure, a thin film pressure sensor is served as an anti-pinch detection device. The control module determines an occurrence of a foreign object being caught and triggers the anti-pinch in function when receiving the detection signal outputted by the thin film pressure sensor. The moving part is controlled to stop or move in the opposite direction by the drive module to achieve the anti-pinch function. Compared to an infrared sensor and a capacitive sensor, the thin film pressure sensor can not only be triggered to output a detection signal when gripping people or animal, but also when gripping other non-living objects, effectively improving a recognition range and safety of the electric sofa anti-pinch system. Moreover, compared to the scheme of judging anti-pinch based on parameters such as motor current and speed, the induction of the thin film pressure sensor is more sensitive, without considering an influence of motor operating parameters such as ripple. A force required to trigger anti-pinch is lower, and it will not cause harm to humans or animal; and based on the piezoelectric effect, the detection signal is generated without the need for a motor parameter signal acquisition and complex processing, which can effectively shorten an anti-pinch judgment time and improve a judgment accuracy. Furthermore, compared to a non-contact detection device, based on thin film pressure sensor, the detection signal can be emitted when a foreign object is indeed caught in the squeezing risk area of the moving part, which can avoid misjudgment and trigger the anti-pinch function incorrectly. Therefore, the embodiments of the present disclosure can improve the reliability of the electric sofa anti-pinch system, enhance the anti-pinch effect, and improve the use safety of the electric sofa.

It should be understood that the content described in this section is not intended to identify key or important features of the embodiments of the present disclosure, nor is it intended to limit the scope of the present disclosure. Other features of the present disclosure will be easily understood through the following specification.

BRIEF DESCRIPTION OF DRAWINGS

In order to provide a clearer explanation of the technical solution in the embodiments of the present disclosure, a brief introduction will be given to the drawings required for the description of the embodiments. It is obvious that the drawings described below are only some embodiments of the present disclosure. For those skilled in the art, other drawings can be obtained based on these drawings without creative work.

DESCRIPTION OF EMBODIMENTS

In order to enable personnel in this technical field to better understand the technical solution of the present disclosure, the following will provide a clear and complete description of the technical solution in the embodiments of the present disclosure in combination with the accompanying drawings. Obviously, the described embodiments are only a part of the embodiments of the present disclosure, not all of them. Based on the embodiments in the present disclosure, all other embodiments obtained by ordinary skilled persons in this field without creative work should fall within the protection scope of the present disclosure.

It should be noted that terms "first", "second", etc. in the specification and claims of the present disclosure and the accompanying drawings are used to distinguish similar objects and do not necessarily need to be used to describe a specific order or sequence. It should be understood that data used in this way can be interchanged in an appropriate circumstance, so that the embodiments of the present disclosure described herein can be implemented in order other than those illustrated or described herein. In addition, terms "including" and "having", and any variations thereof are intended to cover non-exclusive inclusions.

Figure 1:
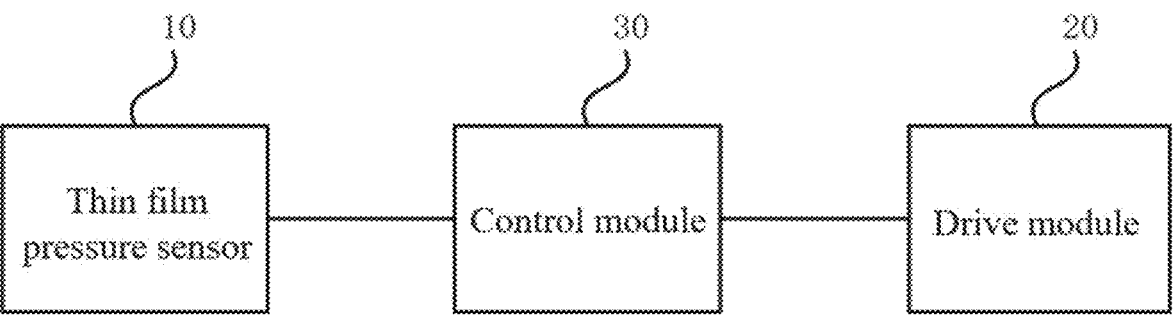
FIG. 1 is a schematic structural diagram of an electric sofa anti-pinch system provided in an embodiment of the present disclosure.

An embodiment of the present disclosure provides an electric sofa anti-pinch system. FIG. 1 is a schematic structural diagram of an electric sofa anti-pinch system provided in an embodiment of the present disclosure. Referring to FIG. 1, the electric sofa anti-pinch system includes a thin film pressure sensor 10, a drive module 20, and a control module 30.

Where, a triggering mechanism of the thin film pressure sensor 10 is provided in a squeezing risk area of a moving part in the electric sofa. The thin film pressure sensor 10 is configured to output a detection signal when the triggering mechanism is squeezed. The drive module 20 is connected to the moving part and configured to drive the moving part to operate. The control module 30 is respectively connected to the thin film pressure sensor 10 and the drive module 20. The control module 30 is configured to control the moving part to stop operating or reversely operate through the drive module 20 when receiving the detection signal.

In an implementation, the electric sofa may include a backrest, a seat frame bracket, and a footrest that are connected in sequence, two armrests are provided at on two sides of the seat frame bracket. At least some components in the backrest, seat frame bracket, and footrest can be provided as the moving part, the moving part includes a driving component. The drive module 20 may include a driving motor, which can control an operation of the moving part by controlling a movement of the driving component. Taking the moving part including the footrest as an example, the footrest may include a leg driving component, and the drive module 20 is connected to the leg driving component, for example, by controlling an extension and a contraction of the leg driving component so as to control a deployment and a retraction of the footrest.

During a process that the moving part operates, a relative motion with the fixed component in the electric sofa, walls, floors, and other fixed facilities can be generated. When the moving part moves close to the fixed facilities, there may exist a squeezing event of a foreign object. When a squeezing event occurs, an anti-pinch function of the electric sofa anti-pinch system needs to be activated to control the moving part to stop operating or reversely operate. The squeezing risk area of the moving part can be understood as an area where there is a risk of the foreign object being caught in the moving part. Taking the moving part including the footrest as an example, when a user unfolds and lifts the footrest, rests on his back, and the footrest is controlled to be retracted and lowered, due to his own blind spot, he may ignore whether there is a child, pet, or other foreign object in a recovery path below the footrest. If the footrest continues to be retracted, it may cause the foreign object under the footrest to be caught, which poses a certain safety hazard, such as injuring child or pet. Moreover, due to an obstruction of foreign object, the footrest cannot be retracted, and the resistance of the drive module 20 is high, which requires to provide a large current, and it is easily damage the drive module 20. Therefore, a back of the footrest can be taken as a squeezing risk area of the footrest. It can be understood that a front of the footrest is one side that contacts the user's leg; the back of the footrest is one side facing the ground when the footrest is unfolded, which is an opposite side to the front of the footrest.

The thin film pressure sensor 10 includes a triggering mechanism, based on a deformation of a conductive material in the triggering mechanism, which causes a change in its resistance value. This change can be detected by measuring a resistance value and converting it into a corresponding electrical signal, which is transmitted as a detection signal to the control module 30. Providing the triggering mechanism in the thin film pressure sensor 10 in the squeezing risk area of the moving part can reliably determine whether a foreign object is caught during the operation of the moving part (i.e. whether squeezing events occur). Once a foreign object is caught, the triggering mechanism will deform due to pressure and output the detection signal. When the control module 30 receives the detection signal, it can know that the foreign object is caught during a current operation of the moving part, and thus activate the anti-pinch function in a timely manner. The drive module 20 controls the moving part to stop operating or reversely operate. In an implementation, when the control module 20 receives the detection signal, it can control the moving part to stop operating first and then operate in an opposite direction for a certain distance, in order to provide a space for moving the foreign object away and improve a safety of the operation of the electric sofa. In an implementation, the triggering mechanism can be provided to fully or partially cover the squeezing risk area according to needs. A specific setting method can be determined according to an actual situation, such as considering cost and detection sensitivity. And a specific deployment method is not limited here.

In the electric sofa anti-pinch system provided by the embodiment of the present disclosure, the thin film pressure sensor 10 is provided as the anti-pinch detection device. The control module 30 determines an occurrence of a foreign object being caught when receiving the detection signal outputted by the thin film pressure sensor 10 and triggers the anti-pinch function. The drive module 20 controls the moving part to stop moving or move in the opposite direction to achieve the anti-pinch function. Compared to an infrared sensor and a capacitive sensor, the thin film pressure sensor 10 can not only be triggered to output the detection signal when people or animal being caught, but also to output the detection signal when other non-living object being caught, which can effectively improve a recognition range and safety of the electric sofa anti-pinch system. Furthermore, compared to the scheme of judging anti-pinch based on parameters such as motor current and speed, the induction of the thin film pressure sensor 10 is more sensitive, without considering an influence of motor operating parameters such as ripple. A force required to trigger the anti-pinch is lower, and it will not cause harm to human or animal; and the detection signal generated in this way does not require motor parameter signal acquisition and complex processing, which can effectively shorten an anti-pinch judgment time and improve a judgment accuracy. Furthermore, compared to a non-contact detection device, based on the thin film pressure sensor 10, a detection signal can be emitted when a foreign object is indeed caught in the squeezing risk area of the moving part, which can avoid misjudgment and trigger the anti-pinch function incorrectly. Therefore, the embodiments of the present disclosure can improve the reliability of the electric sofa anti-pinch system, enhance the anti-pinch effect, and improve a use safety of the electric sofa.

On the basis of the above embodiments, in an implementation, a pressure sensing sensitivity of the thin film pressure sensor 10 can be set according to actual needs. In an implementation, the sensitivity detection lower limit of the thin film pressure sensor 10 is 1 N, in an implementation, it is equal to or slightly less than 0.1 N, so as to improve the sensitivity of the anti-pinch detection. Where an adjustment of the pressure sensing sensitivity of the thin film pressure sensor 10 can be achieved through sensor specification and/or parameter setting.

On the basis of the above embodiments, in an implementation, the electric sofa includes at least one moving part, the drive module 20 includes at least one driving motor, and one driving motor is corresponding connected to at least one moving part, for example, to a driving component in a corresponding moving part; the squeezing risk area of each moving part is corresponding provided with at least one thin film pressure sensor 10. The control module 30 is specifically configured to control the moving part to stop operating or reversely operate through the driving motor connected to the moving part corresponding to the thin film pressure sensor 10 when receiving the detection signal outputted from any thin film pressure sensor 10. That is to say, the moving part in the squeezing risk area where one or more thin film pressure sensors 10 are located can be driven by the same driving motor. The control module 30 can determine a target driving motor that needs to be regulated based on a set position of the thin film pressure sensor 10 that outputs the detection signal, in order to provide the anti-pinch function for the moving part that experiences the squeezing event and achieve an accurate anti-pinch control.

On the basis of the above embodiments, in an implementation, a triggering mechanism of the thin film pressure sensor 10 can be provided corresponding to one squeezing risk area. In an implementation, the triggering mechanism can cover the squeezing risk area where it is located, in order to detect the squeezing event at any position in the squeezing risk area and improve safety. In this case, the triggering mechanism can be in a form of a sheet, mesh, or grid, which can be set according to actual needs. In another implementation, the triggering mechanism can be provided at a position with a higher probability of occurrence of the squeezing event in the squeezing risk area, while other positions are not provided to reduce the cost of the triggering mechanism. In an implementation, the triggering mechanism can be provided to surround around an edge of the squeezing risk area. In this case, the triggering mechanism can be circular, U-shaped, or strip-shaped.

Below, based on a structure of the electric sofa, an exemplary explanation will be given for a specific location of the squeezing risk area, and possible setting methods of the triggering mechanism will be explained accordingly, but it is not intended to limit the present disclosure.

Figure 2:
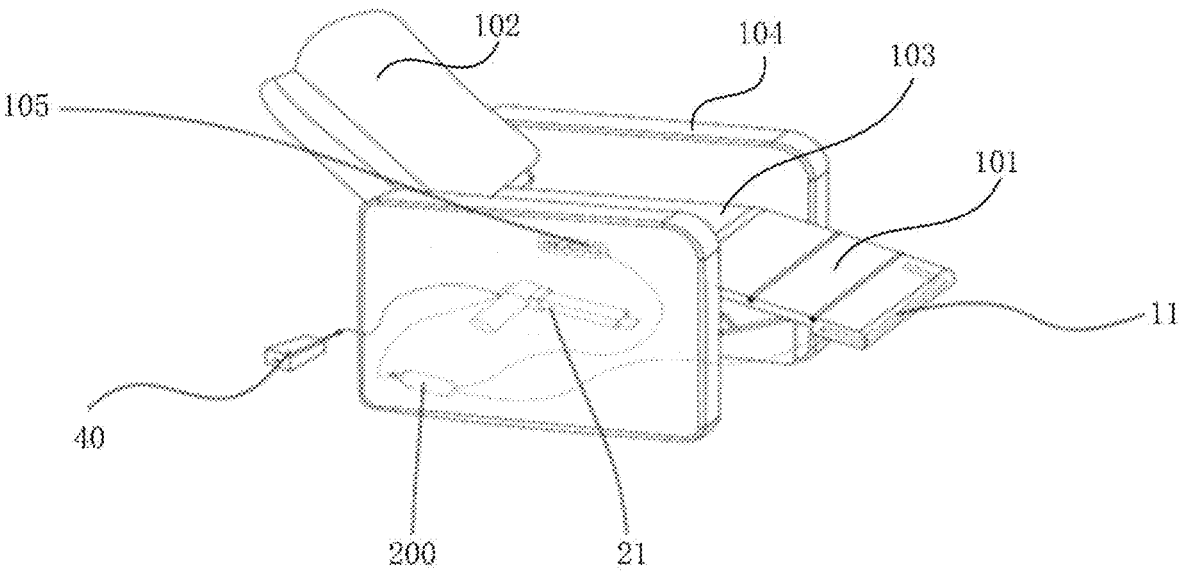
FIG. 2 is a schematic structural diagram of an electric sofa provided in an embodiment of the present disclosure.

FIG. 2 is a schematic structural diagram of an electric sofa provided in an embodiment of the present disclosure. Referring to FIG. 2, in an implementation, the electric sofa includes a seat frame bracket 103, a backrest 102 connected to upper and lower ends of the seat frame bracket, a footrest 101, and two armrests 104 provided on left and right sides of the seat frame bracket.

Where, the moving part in the electric sofa may include a footrest 101; a squeezing risk area of the footrest 101 is a back of footrest 101, which is a side facing the ground after unfolding. Correspondingly, for the thin film pressure sensor 10 on the back of the footrest 101, its triggering mechanism 11 can cover an entire back of the footrest 101 in a sheet or strip shape, or as shown in FIG. 2, it can be arranged in a U-shape along lower, left and right sides of the back of the footrest 101. And the drive module 20 may include a first driving motor 21, which is connected to a leg driving component (such as a leg extension bracket) in the footrest 101 and controls an extension or a retraction of the footrest 101 by controlling an extension or a contraction of the leg driving component.

Thus, when the triggering mechanism 11 on the back of the footrest 101 is squeezed and deformed, a detection signal will be generated to the control module 30. The control module 30 can control the first driving motor 21 to switch a working state, thereby controlling the footrest to stop operating or reversely operate through the leg driving component.

On the basis of the above embodiments, in an implementation, the moving part in the electric sofa may also include a backrest 102; a squeezing risk area of backrest 102 is a back of the backrest; it can be understood that a front of the backrest 102 is one side that contacts the user's back; a back of the backrest 102 is a side facing the wall when folded, which is an opposite side to the front of the backrest 102. Correspondingly, the triggering mechanism 11 of the thin film pressure sensor 10 on the back of the backrest 102 can be in a form of a sheet covering the entire back of the backrest 102, or in the form of a circular, arranged along four edges of the back of the backrest 102. Where the backrest 102 may include a backrest driving component (such as a backrest extension bracket). When the backrest driving component is extended, it can drive the backrest 102 to tilt backwards within a preset angle range. When the backrest drive component contracts, it can drive the backrest 102 to retract to a basically upright state.

In an implementation, the leg driving component and the backrest driving component can be connected through a linkage mechanism, and the first driving motor 21 can be connected to the backrest driving component through the linkage mechanism to synchronously drive the footrest 101 and backrest 102 to unfold or retract. Thus, when the triggering mechanism 11 on the back of the footrest 101 and/or the triggering mechanism 11 on the back of the backrest 102 are squeezed and deform, the detection signal is generated to the control module 30, the control module 30 can control the first driving motor 21 to switch the working state, thereby controlling the footrest to stop operating or reversely operate through the leg driving component, and controlling the backrest 102 to stop operating or reversely operate through the backrest driving component.

In an implementation, the drive module 20 may further include a third driving motor connected to the backrest driving component in the backrest 102 so as to achieve independent driving of the backrest 102 and the footrest 101, thereby improving the diversity and control flexibility of an operation mode of the electric sofa. Thus, when the triggering mechanism 11 on the back of the backrest 102 is squeezed and deforms, a detection signal is generated to the control module 30, the control module 30 can control the third driving motor to switch the working state, thereby controlling the backrest 102 to stop operating or reversely operate through the backrest driving component.

Figure 3:
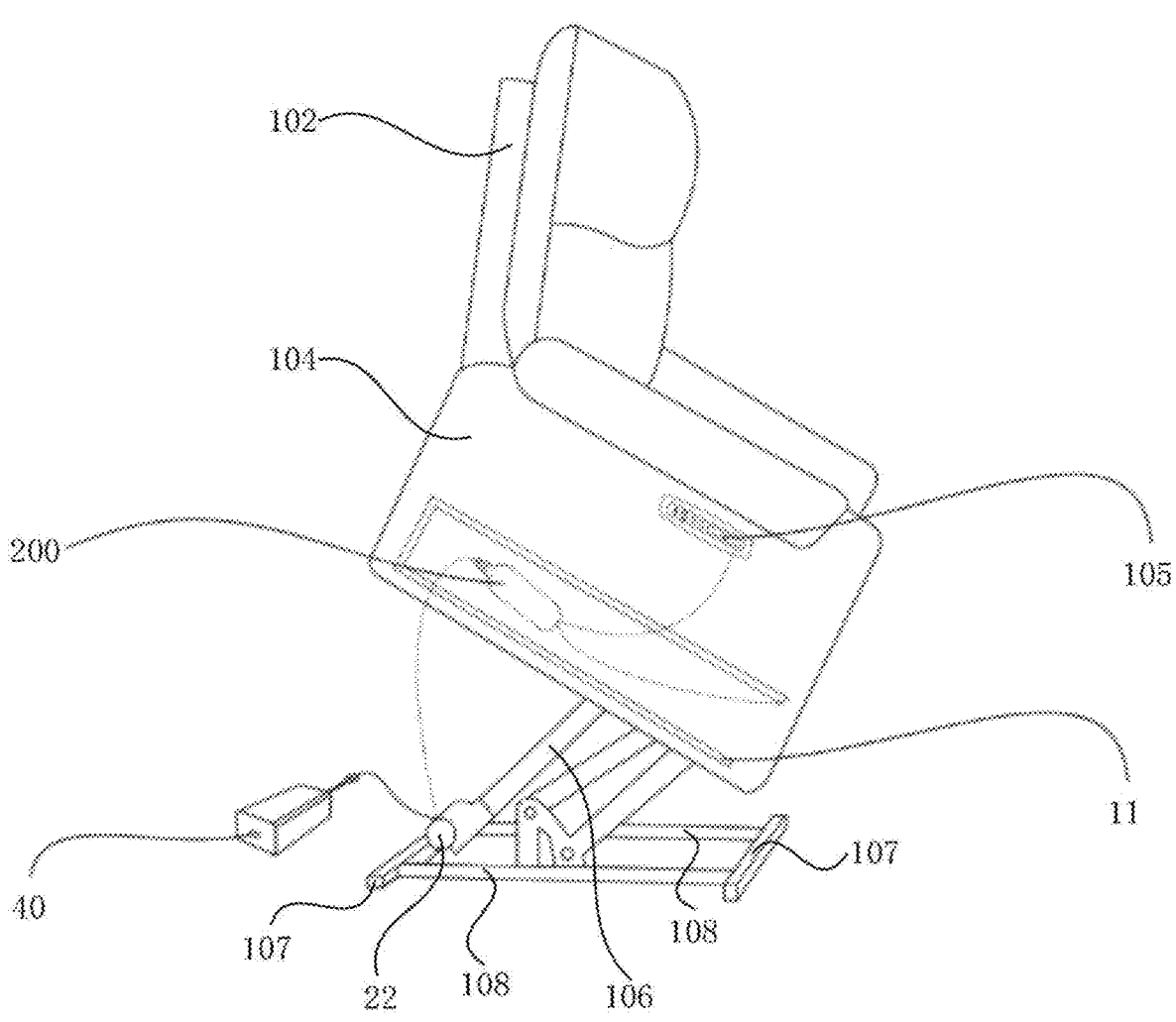
FIG. 3 is another schematic structural diagram of the electric sofa provided in an embodiment of the present disclosure.

FIG. 2 exemplary shows a structure of a conventional functional sofa, but does not limit the scope of the present disclosure. In other embodiments, as shown in FIG. 3, the electric sofa can also be an elderly chair, which can assist elderly in standing by adding a lifting function.

In an implementation, the moving part in the electric sofa further include a lifting component, which includes a lifting drive assembly 106 (such as a lifting bracket), a seat frame bracket 103, and two armrests 104. Where the seat frame bracket 103 is connected between the two armrests 104, and the seat frame bracket 103 is connected to the lifting driving component 106. The drive module drives the seat frame bracket 103 to move by controlling a lifting and descending of the lifting driving component 106, and the armrest 104 runs synchronously with the seat frame bracket 103. A squeezing risk area of the lifting component includes a bottom surface of the seat frame bracket 103 and bottom surfaces of the two armrests 104. The bottom surfaces of the seat frame bracket 103 and the armrests 104 can be located on a same plane or different planes, and can be arranged according to actual needs. When the lifting driving component 106 is lifted, it can drive the seat frame bracket 103 to lift and tilt forward to assist the user in standing. When the lifting driving component 106 descends, it can drive the seat frame bracket 103 to descend and return to its original position or tilt back to assist the user in adjusting his sitting posture. Corresponding to the lifting component, three thin film pressure sensors 10 can be provided and the triggering mechanisms of the three thin film pressure sensors 10 can be respectively provided at bottoms of the two armrests 104 and a bottom of the seat frame bracket 103. In an implementation, one thin film pressure sensor 10 can be provided corresponding to the lifting component, and its triggering mechanism can cover the bottom surfaces of the two armrests 104 and the seat frame bracket 103 in a sheet-like manner, or as shown in FIG. 3, it can be arranged in a U-shape along a left side of a bottom surface of a left armrest, a back of a bottom surface of the seat frame bracket 103, and a right side of a right armrest.

In an implementation, the leg driving component and the lifting driving component can be connected through a linkage mechanism, and the first driving motor 21 can be connected to the lifting driving component through the linkage mechanism to synchronously drive the operation of the footrest 101 and the seat frame bracket 103. Thus, when the triggering mechanism 11 on the back of the footrest 101 and/or at least one triggering mechanism 11 corresponding to the lifting component is squeezed and deforms, a detection signal is generated to the control module 30, the control module 30 can control the first driving motor 21 to switch the working state, thereby controlling the footrest 101 to stop operating or reversely operate through the leg driving component, and controlling the seat frame bracket 103 and the armrest 104 to stop operating or reversely operate through the lifting driving component 106.

In an implementation, the drive module 20 may further include a second driving motor 22 connected to the lifting driving component 106 so as to achieve independent driving of the lifting component and the footrest 101, thereby improving the diversity and control flexibility of the operation mode of the electric sofa. Thus, when at least one triggering mechanism 11 corresponding to the lifting component is squeezed and deforms, a detection signal is generated to the control module 30, the control module 30 can control the second driving motor 22 to switch the working state, thereby controlling the seat frame bracket 103 and the armrest 104 to stop operating or reversely operate through the lifting driving component 106.

Continuing to refer to FIG. 3, based on the above embodiments, in an implementation, the electric sofa may further include a chassis fixedly connected to one side of the lifting driving component 106 away from the seat frame bracket 103. The electric sofa anti-pinch system further includes at least one infrared sensor (not shown in the figure); the infrared sensor is connected to the control module 30. A transmitting terminal and a receiving terminal of the infrared sensor are relatively provided on the chassis; the transmitting terminal and receiving terminal of the infrared sensor are both connected to the control module 30, for example. When there is no foreign object on the chassis, there is no obstruction between the transmitting terminal and receiving terminal of the infrared sensor, and the receiving terminal of the infrared sensor can receive an infrared signal from the transmitting terminal. When the receiving terminal of the infrared sensor cannot receive the infrared signal from a corresponding transmitting terminal, it indicates that there is a foreign object obstruction between the transmitting terminal and receiving terminal of the infrared sensor. Based on this, the control module 30 is further configured to control all moving part to stop operating through the drive module 20 when the receiving terminal of the at least one infrared sensor cannot receive the infrared signal, such as controlling all driving motors in the drive module 20 to stop operating. In an implementation, a signal emitted by the infrared sensor can be set to have a highest priority level. Regardless of whether the thin film pressure sensor 10 sends a detection signal when the infrared sensor emits a signal indicating that it cannot be received, the control module 30 controls all driving motors to stop operating so as to ensure the safety and reliability of the operation of the electric sofa.

In an implementation, the chassis may include two first support rods 107 arranged in parallel, and two second support rods 108 connected between the two first support rods 107 and arranged in parallel. At least one infrared sensor may include at least one first infrared sensor; a transmitting terminal and a receiving terminal of the first infrared sensor are respectively provided on the two first support rods 107; and/or at least one second infrared sensor; a transmitting terminal and a receiving terminal of the second infrared sensor are respectively provided on the two second support rods 108. In an implementation, a plurality of first infrared sensors are provided side by side and a plurality of second infrared sensors are provided side by side to comprehensively detect the presence of foreign object on the chassis.

Figure 4:
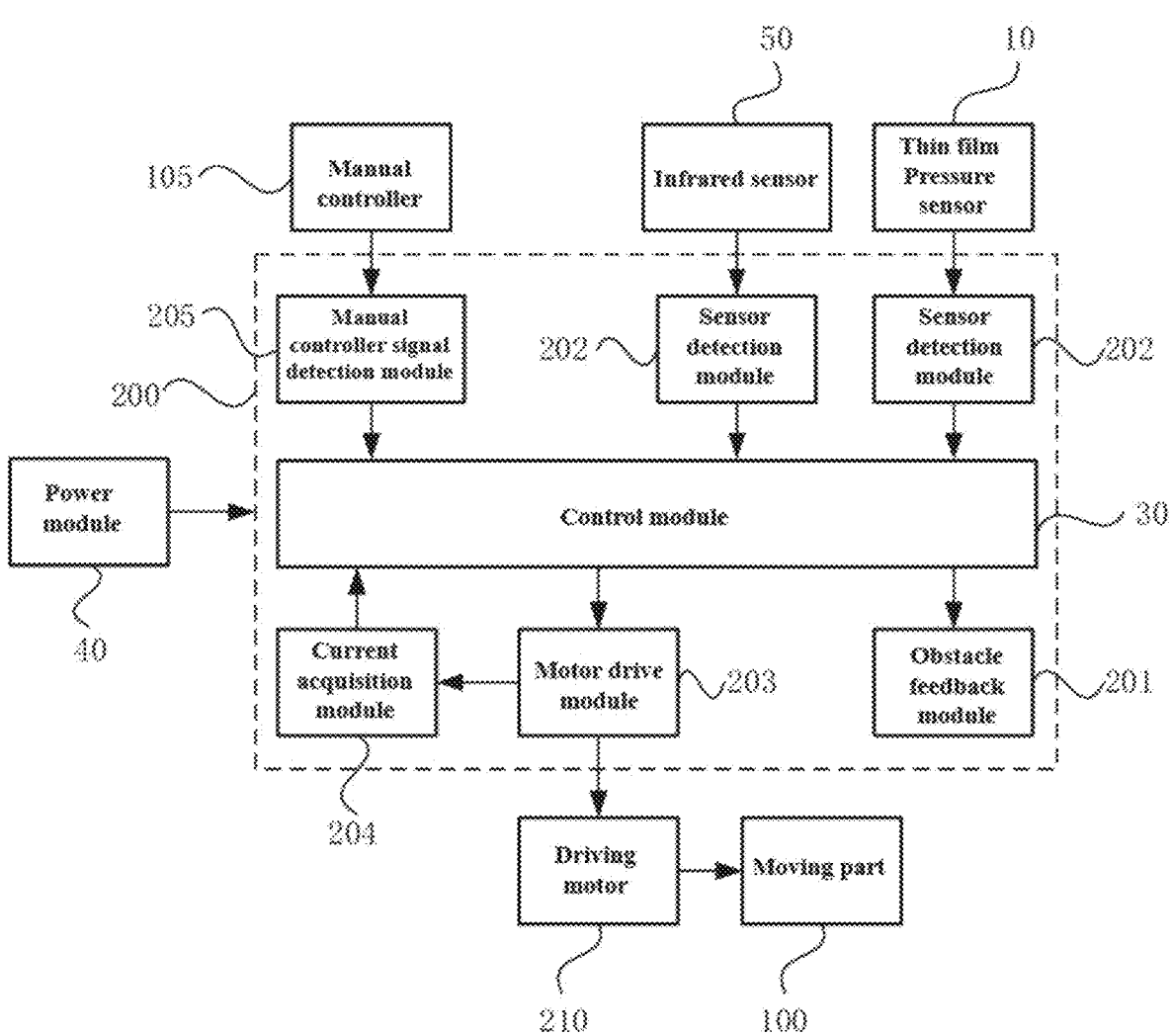
FIG. 4 is another schematic structural diagram of the electric sofa anti-pinch system provided in an embodiment of the present disclosure.

FIG. 4 is another schematic structural diagram of the electric sofa anti-pinch system provided in an embodiment of the present disclosure. Referring to FIG. 4, based on the above embodiments, the electric sofa anti-pinch system can include an obstacle feedback module 201, a connection control module 30; the control module 30 is further configured to control the obstacle feedback module 201 to prompt a foreign object when the moving part 100 stops operating or reversely operates through the drive module 20 (specifically, through the driving motor 210); where the obstacle feedback module 201 includes at least one of a buzzer, a vibrator, and an indicator light, a foreign object prompt can be achieved through at least one of sound and light vibrations, so that the user can timely obtain information about the foreign object being caught and make a corresponding response, such as moving the caught foreign object away.

An implementation logic of anti-pinch control function for different types of electric sofas can refer to the following settings.

1. For an electric sofa anti-pinch system with single motor: one thin film pressure sensor can be provided, and the triggering mechanism of the sensor is installed on the back of the sofa footrest. The control module receives the detection signal from the thin film pressure sensor and triggers the ant-pinch function. The footrest stops operating and operates in an opposite direction for a short distance through the first driving motor. A basic structure of the functional sofa can be seen in FIG. 2.

2. For an electric sofa anti-pinch system with double motors: one thin film pressure sensor can be provided for each moving part driven by the driving motor. Specifically, one driving motor is configured to drive the footrest, and the triggering mechanism of the thin film pressure sensor is provided on the back of the footrest. The detection signal of the sensor causes the control module to control the footrest to stop operating and operates in the opposite direction for a short distance through a corresponding driving motor that pushes the footrest. Another driving motor is configured to drive the backrest, and the triggering mechanism of another thin film pressure sensor is provided on the back of the backrest. The detection signal of this sensor causes the control module to control the backrest to stop operating and operate in the opposite direction for a short distance through a corresponding driving motor that pushes the backrest.

3. For an elderly chair anti-pinch system with single motor: one thin film pressure sensor can be provided, and the triggering mechanism of the sensor is installed on the back of the sofa footrest; in an implementation, two thin film pressure sensors can be provided, the triggering mechanisms of the two thin film pressure sensors are respectively provided at the back of the footrest and below the armrest, or provided on the back of the footrest and on the back of the backrest; in an implementation, three thin film pressure sensors can be provided, the triggering mechanisms of the three thin film pressure sensors are respectively provided at the back of the footrest, under the armrest, and on the back of the backrest. When any thin film pressure sensor outputs the detection signal, the anti-pinch function is triggered, and the control module controls each moving part to stop operating and operate in the opposite direction for a short distance through the driving motor. Where the basic structure of the elderly chair can be seen in FIG. 3, which has added a lifting function compared to FIG. 2.

4. For an elderly chair with single motor, in addition to various situations mentioned in the above, and in an implementation, an infrared sensor can also be installed. The infrared sensor is provided on a chassis of the elderly chair, and the signal emitted by the infrared sensor has the highest priority level. Regardless of whether the thin film pressure sensor sends a detection signal when the infrared sensor emits a signal indicating that it cannot be received, the control module controls the driving motor to stop operating and can also control the obstacle feedback module to issue an alarm.

5. For the elderly chair with double motors, one thin film pressure sensor can be provided for each moving part driven by each driving motor. In an implementation, one driving motor is configured to drive the footrest and backrest, and one triggering mechanism corresponding to the thin film pressure sensor can be provided on the back of the footrest, the triggering mechanism of another thin film pressure sensor can be provided on the back of the backrest. When at least one of the two sensors sends the detection signal, the control module controls the footrest and backrest to stop operating and operates in the opposite direction for a short distance through the corresponding driving motor that pushes the footrest and backrest. Another driving motor is configured to drive the lifting driving component, and a triggering mechanism of the thin film pressure sensor can be correspondingly provided below the armrest and seat frame bracket. The detection signal of this sensor causes the control module to control the lifting component to stop operating and operate in the opposite direction for a short distance through the corresponding the driving motor of the lifting driving component. Or the moving part driven by two driving motors can also be combined in other ways, as long as the two driving motors can correspondingly drive all the moving part. The control module can adjust a control strategy of the anti-pinch function based on a correspondence relationship between the driving motor and the moving part. In any of the above situations, the anti-pinch system can also be provided with an infrared sensor, which is installed on the chassis of the elderly chair. The signal emitted by the infrared sensor has the highest priority level. Regardless of whether the thin film pressure sensor sends a detection signal when the infrared sensor emits a signal indicating that it cannot be received, the control module controls all driving motors to stop operating and can also control the obstacle feedback module to issue an alarm.

6. The sensitivity of any of the above anti-pinch systems can be set to be high, for example, it can sense a resistance below 0.1 N.

Continuing to refer to FIG. 4, based on the above embodiments, in an implementation, the electric sofa anti-pinch system can include a power module 40 for supplying power to the entire electric sofa, at least to the electrical components in the entire anti-pinch system. In an implementation, in addition to the thin film pressure sensor 10, infrared sensor 50, power module 40, and drive module 20, other functional modules of the electric sofa anti-pinch system (such as control module 30 and various circuit functional modules related to the control process) can be integrated into an anti-pinch control box 200. Combining FIG. 2 and FIG. 3, each driving motor 210 in the anti-pinch control box 200 and the drive module 20 can be provided in a storage space below the electric sofa seat frame bracket 103. The anti-pinch control box 200 can detect a control signal outputted by a manual controller 105 and output signals of various sensors, as well as control each driving motor 210 to drive the entire electric sofa to operate. In an implementation, the power module 40 can be connected to the control module 30 and various circuit functional modules related to the control process.

Continuing to refer to FIG. 4, based on the above embodiments, in an implementation, the various circuit functional modules related to the control process in the electric sofa anti-pinch system may include at least one of the following: an obstacle feedback module 201, a sensor detection module 202, a motor drive module 203, a current acquisition module 204, and a manual controller signal detection module 205. Where the above-mentioned circuit functional modules are all connected to the control module 30, configured to transmit a signal to the control module 30 or be controlled by the control module 30 to execute a corresponding command. In an implementation, the obstacle feedback module 201 is configured to prompt a foreign object through at least one method of sound and light vibration under a control of the control module 30. The sensor detection module 202 can be multiple, provided corresponding to each sensor (including the thin film pressure sensor 10 and the infrared sensor 50), and is configured to convert the signal outputted by the sensor into a signal that can be recognized by the control module 30 and transmitted to the control module 30. The motor drive module 203 can be at least one, connected to the driving motor 210. The control module 30 controls an operation state of the driving motor 210 through the motor drive module 203, thereby controlling the operation state of the moving part 100 connected to the driving motor 210. In an implementation, the motor drive module 203 can be provided only for the driving motor that may generate a squeezing event and connected to the moving part, so that the control module can control the operation state of the driving motor through the motor drive module 203 to achieve the anti-pinch function; other driving motors can be configured with a motor drive module 203 as needed, controlled by the control module 30, or without the motor drive module 203, directly controlled by the manual controller 105. The current acquisition module 204 can be connected to the motor drive module 203 and provided one-to-one with the motor drive module 203; the current acquisition module 204 can collect a driving current of the driving motor 210 through the motor drive module 203 and transmit it to the control module 30; the control module 30 can determine the working state of the driving motor 210 based on the driving current and perform a corresponding control. The electric sofa may further include the manual controller (or wire controller) 105, and a manual controller signal detection module 205 is connected between the manual controller 105 and the control module 30. The user can operate the manual controller 105, such as clicking on a function button in the manual controller 105 to output the control signal. The control signal is converted into a signal that can be recognized by the control module 30 through the manual controller signal detection module 205 and transmitted to the control module 30. The control module 30 controls the drive module 20 based on the control signal.

A working process of the electric sofa anti-pinch system can be as follows: the control module 30 detects the control signal from the manual controller 105 and drives the relevant driving motor 210 to perform a corresponding action, and real-time collects the driving current of the driving motor 210. When the collected driving current exceeds a set threshold, it determines that the driving motor 210 has a locked rotor abnormality and controls the driving motor 210 to stop operating. The control module 30 also detects the output signals of the thin film pressure sensor 10 and the infrared sensor 50 in real time. When any sensor detection module 202 outputs a sensor signal indicating the occurrence of a squeezing event, the control module 30 controls the implementation of the corresponding anti-pinch function. At the same time, the obstacle feedback module 201 is controlled to issue a foreign object prompt, reminding the user that something has been caught.

Where there may be one or more sensor detection module 202, that is, one or more sensor interfaces can be provided in the anti-pinch control box 200. Based on a plurality of sensor interfaces, it is possible to detect whether the thin film pressure sensor 10 at a plurality of positions outputs the detection signal, thereby determining where the foreign object is located, and controlling the corresponding driving motor 210 to stop operating and reversely operate for a certain distance, thereby achieving the anti-pinch function.

The above embodiments have explained the principle of the anti-pinch function of the anti-pinch system. A specific circuit structure of each functional module in the electric sofa anti-pinch system is illustrated below, but it is not intended to limit the present disclosure.

Figure 5:
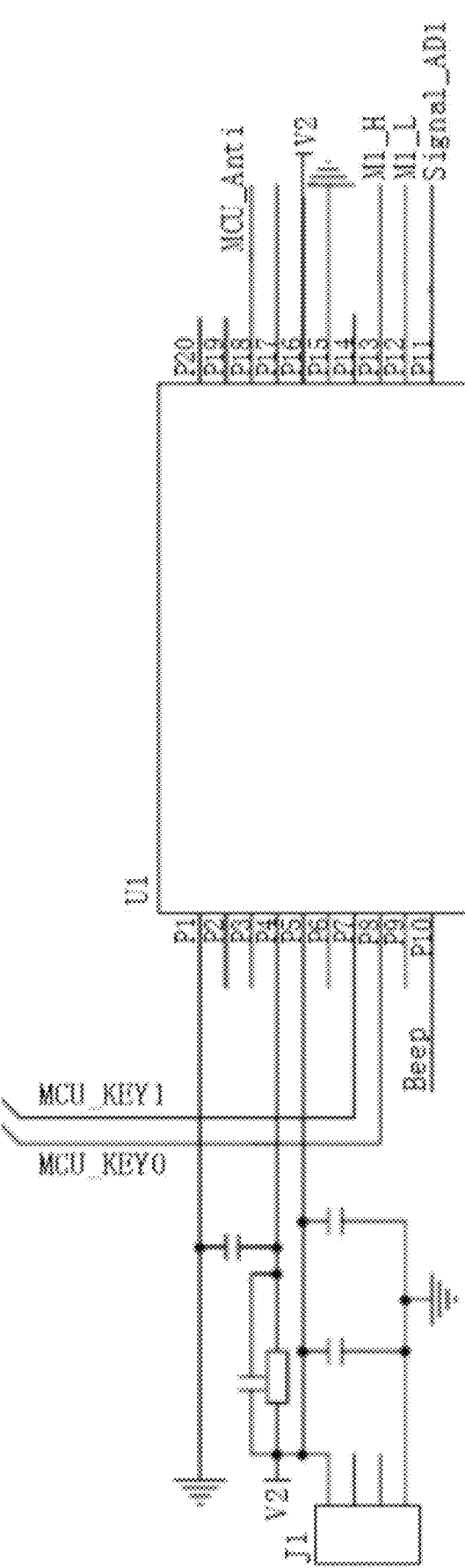
FIG. 5 is a schematic structural diagram of a control module provided in an embodiment of the present disclosure.

FIG. 5 is a schematic structural diagram of a control module provided in an embodiment of the present disclosure. Referring to FIG. 5, in one embodiment, the control module 30 includes a main control chip U1 and a peripheral circuit required for operation. The main control chip U1 is, for example, an MCU (Microcontroller Unit) or a microcontroller. Pins of the main control chip U1 can be numbered from top left to bottom left, and then from bottom right to top right, and a i-th pin labeled as Pi. The main control chip U1 is, for example, GD32F130F6P6TR.

In an implementation, a seventh pin P7 and an eighth pin P8 of the main control chip U1 are both connected to the manual controller signal detection module 205, respectively configured to receive button signals related to the control signal provided by different functional buttons of the manual controller 105, such as a first button signal MCU_KEY0 and a second button signal MCU_KEY1. The main control chip U1 can be connected to the obstacle feedback module 201 through a tenth pin P10 to provide an alarm command signal Beep to the obstacle feedback module 201. An eleventh pin P11 of the main control chip U1 can be connected to the current acquisition module 204 so as to receive a driving current Signa_1AD1 collected by the current acquisition module 204. In an implementation, the control module may determine that the driving motor has a locked rotor abnormality when a received drive current exceeds the set threshold, and control the driving motor to stop operating, and/or the control module may determine whether a squeezing event has occurred based on the received drive current, thereby controlling the operating state of the driving motor. A twelfth pin P12 and a thirteenth pin P13 of the main control chip U1 are both connected to the motor drive module 203, thereby providing a first driving signal M1-H and a second driving signal M1_L to the motor drive module 203 respectively, so as to control an output state of the motor drive module 203. A fifteenth pin P15 of the main control chip U1 can be a ground pin, directly grounded. A sixteenth pin P16 of the main control chip U1 can be its power pin, which is connected to a second power signal V2, for example, a 3.3V DC power signal. An eighteenth pin P18 of the main control chip U1 can be connected to the sensor detection module 202, which is configured to receive a sensor signal MCU_Snti converted by the sensor detection module 202 based on the output signal of the sensor.

Other pins of the main control chip U1 can be connected to a peripheral circuit such as a resistor and a capacitor, or connected to a relevant functional signal or a floating pin according to a functional requirement, and is not specifically limited here. In an implementation, an interface J1 serves as a programming interface of the main control chip U1, and two middle pins of the interface J1 can be connected to a nineteenth pin P19 and a twentieth pin P20 of the main control chip U1, respectively. A fourth pin P4 of the main control chip U1 can be its reset pin.

Figure 6:
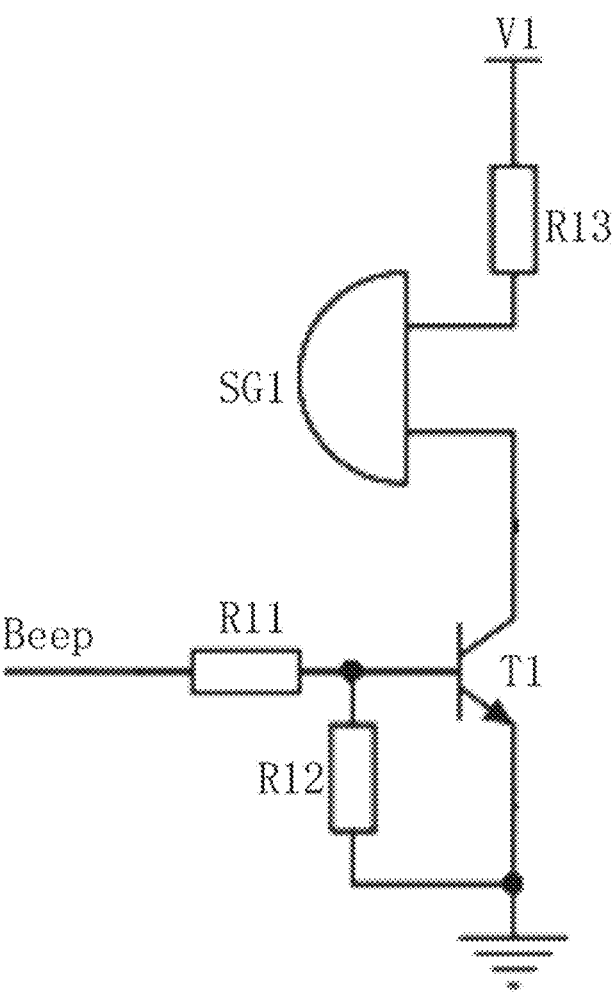
FIG. 6 is a schematic structural diagram of an obstacle feedback module provided in an embodiment of the present disclosure.

FIG. 6 is a schematic structural diagram an obstacle feedback module provided in an embodiment of the present disclosure. Referring to FIG. 6, in an implementation, the obstacle feedback module 201 may include a buzzer SG1, which can sound a foreign object prompt. The buzzer SG1 can be packaged in the anti-pinch control box 200 or provided in other positions of the electric sofa.

In an implementation, the obstacle feedback module 201 includes the buzzer SG1 and a first transistor T1; one end of buzzer SG1 is connected to a first power signal V1, the other end of the buzzer SG1 is connected to a first pole of the first transistor T1, a control pole of the first transistor T1 is connected to the control module so as to connect the alarm command signal Beep. A second pole of the first transistor is grounded. When the alarm command signal Beep controls the first transistor T1 to conduct, the buzzer SG1 is powered on and emits a buzzing sound to indicate a foreign object.

In an implementation, the obstacle feedback module 201 may further include a protection circuit composed of resistor elements. In an implementation, one end of the buzzer SG1 can be connected to the first power signal V1 through a resistor R13, and the alarm command signal Beep can be provided to the control pole of the first transistor T1 after voltage division by resistors R11 and R12 so as to ensure that a control pole voltage of the first transistor T1 does not exceed its applicable range. In an implementation, the first transistor may be a transistor, a MOS transistor, or other controllable switching transistor. The first power signal V1 can be a 29V DC power signal.

Figure 7:
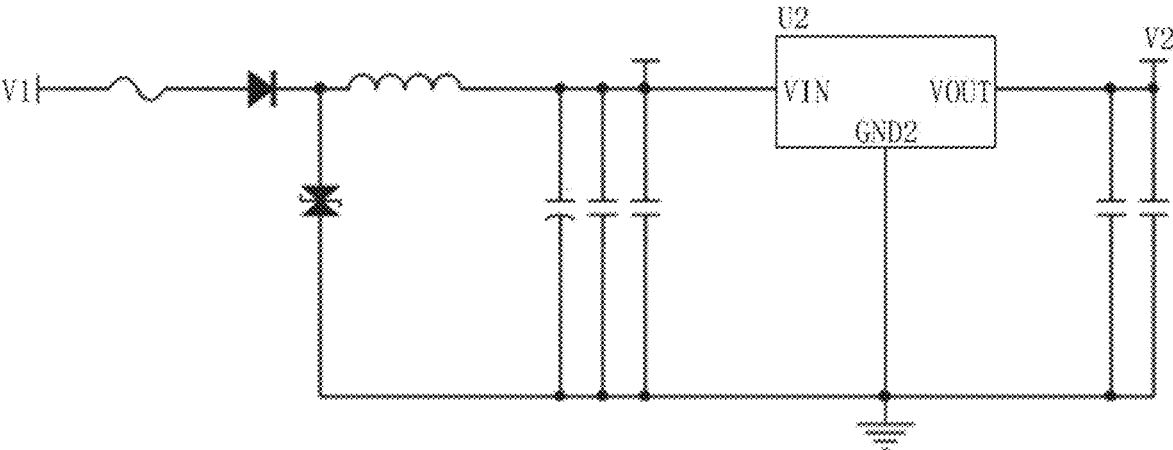
FIG. 7 is a schematic structural diagram of a power module provided in an embodiment of the present disclosure.

FIG. 7 is a schematic structural diagram of a power module provided in an embodiment of the present disclosure. Referring to FIG. 7, in an implementation, the power module 40 is configured to convert the first power signal V1 into the second power signal V2 for output. The power module 40 includes a power conversion chip U2, an input terminal VIN of the power conversion chip U2 is connected to the first power signal V1, a ground terminal GND2 of the power conversion chip U2 is grounded, an output terminal VOUT of the power conversion chip U2 is connected to the control module, and other functional modules that require the use of the second power signal V2 for power supply. The power conversion chip U2 is, for example, a low dropout voltage regulator. In an implementation, to ensure the operation of the power conversion chip U2, a peripheral circuit composed of a fuse, a diode, an electrostatic protection diode, a capacitor, and an inductor can also be provided for the power conversion chip U2.

Figure 8:
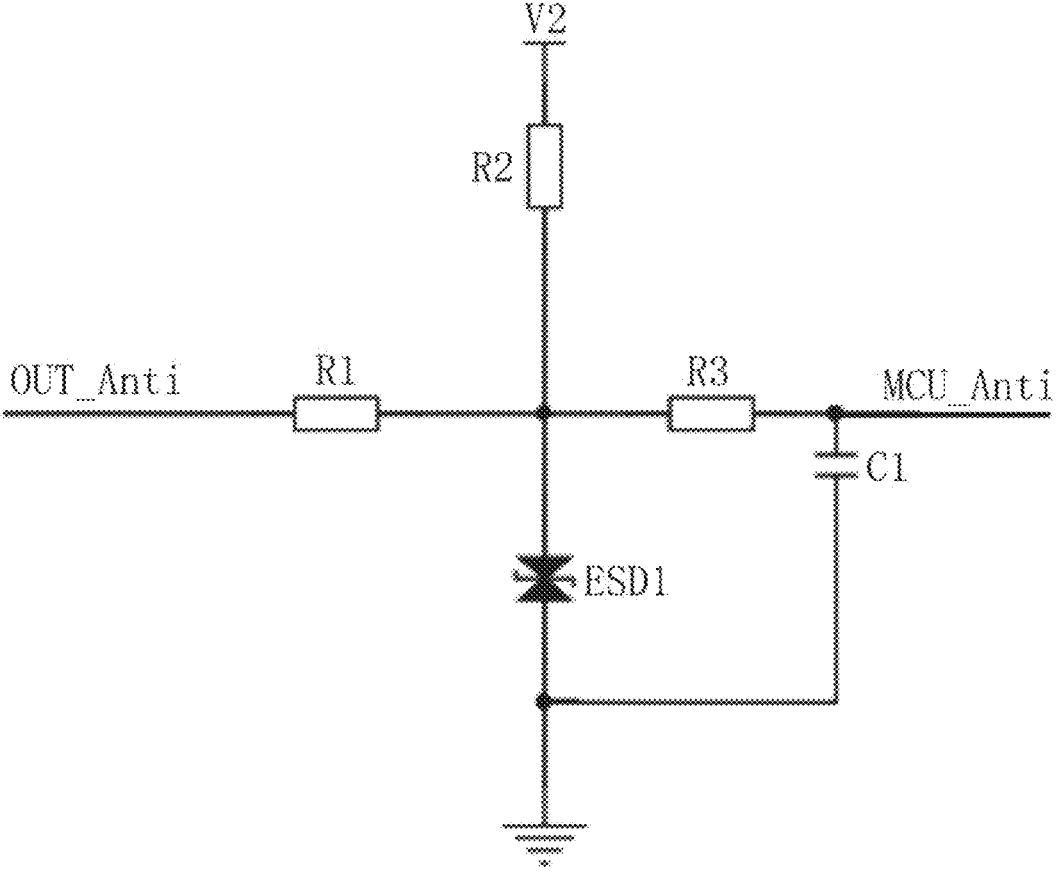
FIG. 8 is a schematic structural diagram of a sensor detection module provided in an embodiment of the present disclosure.

FIG. 8 is a schematic structural diagram of a sensor detection module provided in an embodiment of the present disclosure. Referring to FIG. 8, in an implementation, the sensor detection module 202 can include a first resistor R1, a second resistor R2, a third resistor R3, a first capacitor C1, and a first electrostatic protection diode ESD1; a first end of the first resistor R1 receives an output signal OUT_Snti from the sensor, which can be connected to the output terminal of the thin film pressure sensor or the infrared sensor. A second end of the first resistor R1 is respectively connected to a first end of the second resistor R2, a first end of the third resistor R3, and a first end of the first electrostatic protection diode ESD1. A second end of the second resistor R2 is connected to the second power signal V2, and a second end of the third resistor R3 is connected to the control module for transmitting a sensor signal MCU_Snti to the control module. A second end of the first electrostatic protection diode ESD1 is grounded, a first end of the first capacitor C1 is connected to a second end of the third resistor R3, and a second end of the first capacitor C1 is grounded.

Where the detection signal outputted by the thin film pressure sensor can be at a low potential, and the signal outputted by the infrared sensor that is configured to characterize the inability to receive the signal from the transmitting terminal can be a low potential. Thus, when the output signal OUT_Snti of the sensor is a low potential, the sensor signal MCU_Snti outputted by the sensor detection module 202 is a low potential. The control module can determine the occurrence of a squeezing event and activate the anti-pinch function when receiving the low potential sensor signal MCU_Snti. When the sensor does not output a signal, the sensor signal MCU_Snti outputted by the sensor detection module 202 is a high potential of the second power signal V2. The control module can determine that there is no squeezing event when receiving the high potential sensor signal MCU_Snti.

Figure 9:
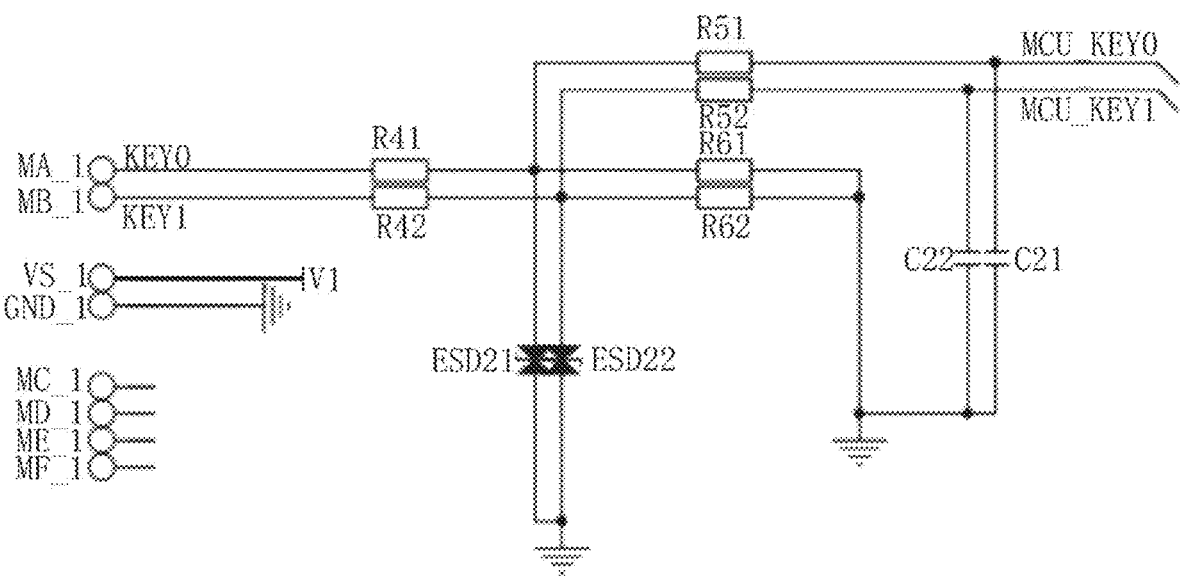
FIG. 9 is a schematic structural diagram of a manual controller signal detection module provided in an embodiment of the present disclosure.

FIG. 9 is a schematic structural diagram of a manual controller signal detection module provided in an embodiment of the present disclosure. Referring to FIG. 9, the manual controller signal detection module includes at least one button signal detection unit corresponding to at least one function button provided in the manual controller; the button signal detection unit includes a fourth resistor, a fifth resistor, a sixth resistor, a second capacitor, and a second electrostatic protection diode. A first end of the fourth resistor is connected to a corresponding function button of the button signal detection unit, configured to receive a control signal (such as high potential) formed by the user when pressing the function button. A second end of the fourth resistor is respectively connected to a first end of the fifth resistor, a first end of the sixth resistor, and a first end of the second electrostatic protection diode. A second end of the fifth resistor is connected to the control module, configured to transmit a button signal related to the control signal to the control module. A second end of the sixth resistor is grounded, a second end of the second electrostatic protection diode is grounded, a first end of the second capacitor is connected to a second end of the fifth resistor, and a second end of the second capacitor is grounded.

When the function button is pressed, the control signal is high potential, and the button signal detection unit can output a high potential button signal. The control module can determine that a corresponding function button is pressed when receiving the high potential button signal. When the function button is not pressed, the button signal detection unit can output a low potential (such as a potential of a ground signal) button signal, and the control module can determine that a corresponding function button is not pressed when receiving the low potential button signal.

FIG. 9 exemplarily shows button signal detection units corresponding to two functional buttons. A first button signal detection unit corresponding to a first functional button MA_1 includes a first $4^{th}$ resistor R41, a first $5^{th}$ resistor R51, a first $6^{th}$ resistor R61, a first $2^{nd}$ capacitor C21, and a first $2^{nd}$ electrostatic protection diode ESD21. When the first function button MA_1 is pressed, a first control signal KEY0 is formed, which is correspondingly converted into the first button signal MCU_KEY0 by the first button signal detection unit. A second button signal detection unit corresponding to a second function button MB_1 includes a second $4^{th}$ resistor R42, a second $5^{th}$ resistor R52, a second $6^{th}$ resistor R62, a second $2^{nd}$ capacitor C22, and a second $2^{nd}$ electrostatic protection diode ESD22. When the second function button MB_1 is pressed, a second control signal KEY1 is formed, which is correspondingly converted into the second button signal MCU_KEY1 by the second button signal detection unit. The first function button MA_1 is, for example, an unfolded button of the footrest, and the second function button MB_1 is, for example, a retracted button of the footrest. In an implementation, the controller may further include other function buttons for configuring other functions or reserved function buttons for function expansion, such as a third function button MC_1, a fourth function button MD_1, a fifth function button ME_1, and a sixth function button MF_1 shown in FIG. 9. Where, each functional button can be configured with a corresponding button signal detection unit. A power terminal VS_1 of the controller can be connected to the first power signal V1, and a ground terminal GND_1 of the manual controller is directly grounded.

Figure 10:
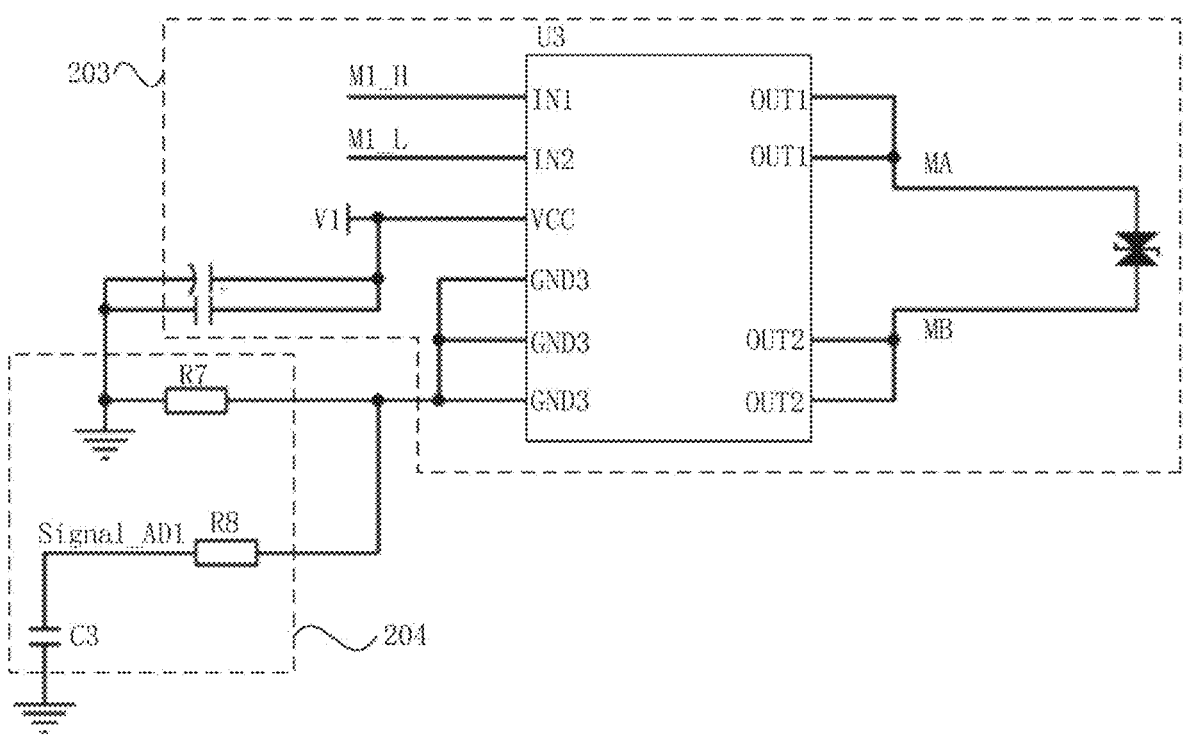
FIG. 10 is a schematic structural diagram of a motor drive module and a current acquisition module provided in an embodiment of the present disclosure.

FIG. 10 is a schematic structural diagram of a motor drive module and a current acquisition module provided in an embodiment of the present disclosure. In an implementation, the motor drive module 203 includes a motor drive chip U3, an input terminal of the motor drive chip U3 is connected to the control module, and an output terminal U3 of the motor drive chip is connected to a driving motor corresponding to the motor drive module. In an implementation, a first input terminal IN1 and a second input terminal IN2 of the motor driving chip U3 are respectively connected to the first driving signal M1-H and the second driving signal M1_L. A first output terminal OUT1 and a second output terminal OUT2 of the motor driving chip U3 output a first control signal MA and a second control signal MB, respectively so as to control the operation state of the driving motor. A power terminal VCC of the motor drive chip U3 is connected to the first power signal V1, and a ground terminal GND3 is grounded. To ensure a stable operation of the motor drive chip U3, a peripheral protection circuit composed of a capacitor and an electrostatic protection diode can also be provided with.

Continuing to refer to FIG. 10, based on the above embodiments, and in an implementation, the current acquisition module 204 may include a seventh resistor R7, an eighth resistor R8, and a third capacitor C3; a first end of the seventh resistor R7 is connected to a ground terminal GND3 of the motor drive chip U3, a second end of the seventh resistor R7 is grounded, a first end of the eighth resistor R8 is connected to a ground terminal GND3 of the motor drive chip U3, and a second end of the eighth resistor R8 is connected to a first end of the third capacitor C3 and the control module, respectively. A second end of the third capacitor C3 is grounded. The current acquisition module 204 samples the current through a resistor, and a second end of the eighth resistor R8 transmits the driving current Signa_1AD1 collected by the current acquisition module 204 to the control module.

In summary, the present embodiment of the present disclosure installs the thin film pressure sensor at a specific position on the electric sofa (the squeezing risk area of the moving part), the area with the risk of a foreign object being caught is covered. Then, the control module detects the signal outputted by the thin film pressure sensor to determine whether a foreign object is caught during the operation of the moving part of the electric sofa, achieving the anti-pinch function. The electric sofa anti-pinch system provided in the embodiment of the present disclosure has the advantages of simple installation, sensitive triggering, wide detection range, and few usage restrictions.

An embodiment of the present disclosure further provides an electric sofa, including a moving part and the electric sofa anti-pinch system as provided in above embodiments of the present disclosure, which has corresponding beneficial effects.

The above specific embodiments do not constitute a limitation on the protection scope of the present disclosure. Technicians in this field should understand that various modifications, combinations, sub-combinations, and substitutions can be made based on design requirements and other factors. Any modifications, equivalent substitutions, and improvements made within the spirit and principles of the present disclosure shall be included in the protection scope of the present disclosure.

What is claimed is:

1. An electric sofa anti-pinch system, comprising:
   a thin film pressure sensor, wherein a triggering mechanism of the thin film pressure sensor is provided in a squeezing risk area of at least one moving part in the electric sofa; the thin film pressure sensor is configured to output a detection signal when the triggering mechanism is squeezed;
   a drive module, connected to the at least one moving part and configured to drive the at least one moving part to operate;
   a control module, which is respectively connected to the thin film pressure sensor and the drive module; the control module is configured to control the at least one moving part to stop operating or reversely operate through the drive module when receiving the detection signal;
   wherein the electric sofa comprises the at least one moving part, the drive module comprises at least one driving motor, and one driving motor is correspondingly connected to the at least one moving part; the squeezing risk area of each of the least one moving part is corresponding provided with at least one thin film pressure sensor;
   the control module is configured to control the at least one moving part to stop operating or reversely operate through the driving motor connected to the at least one moving part corresponding to the thin film pressure sensor when receiving the detection signal outputted from any one thin film pressure sensor.

2. The electric sofa anti-pinch system according to claim 1, wherein the at least one moving part comprises a footrest; a squeezing risk area of the footrest is a back of the footrest;

the drive module comprises a first driving motor connected to a leg driving component in the footrest.

3. The electric sofa anti-pinch system according to claim 2, wherein the at least one moving part further comprises a lifting part, the lifting part comprises a lifting driving component, a seat frame bracket, and two armrests; the seat frame bracket is connected between the two armrests, and the seat frame bracket is connected to the lifting driving component; a squeezing risk area of the lifting component comprises a bottom surface of the seat frame bracket and bottom surfaces of the two armrests;

the first driving motor is further connected to the lifting driving component.

4. The electric sofa anti-pinch system according to claim 3, wherein the electric sofa further comprises a chassis fixedly connected to one side of the lifting driving component away from the seat frame bracket;

wherein the electric sofa anti-pinch system further comprises:

at least one infrared sensor, connected to the control module, a transmitting terminal and a receiving terminal of the infrared sensor are relatively provided on the chassis; when there is no foreign object on the chassis, there is no obstruction between the transmitting terminal and receiving terminal of the infrared sensor; the control module is further configured to control the at least one moving part to stop operating through the drive module when the receiving terminal of the at least one infrared sensor cannot receive an infrared signal.

5. The electric sofa anti-pinch system according to claim 4, wherein the chassis comprises two first support rods arranged in parallel and two second support rods connected between the two first support rods and arranged in parallel;

wherein the at least one infrared sensor comprises:

at least one first infrared sensor; a transmitting terminal and a receiving terminal of the first infrared sensor are relatively provided on the two first support rods;

at least one second infrared sensor; a transmitting terminal and a receiving terminal of the second infrared sensor are relatively provided on the two second support rods.

6. The electric sofa anti-pinch system according to claim 4, wherein the chassis comprises two first support rods arranged in parallel and two second support rods connected between the two first support rods and arranged in parallel;

wherein the at least one infrared sensor comprises:

at least one second infrared sensor; a transmitting terminal and a receiving terminal of the second infrared sensor are relatively provided on the two second support rods.

7. The electric sofa anti-pinch system according to claim 2, wherein the drive module further comprises a second driving motor connected to a lifting driving component.

8. The electric sofa anti-pinch system according to claim 2, wherein the at least one moving part further comprises a backrest; a squeezing risk area of the backrest is a back of the backrest;

the first driving motor is further connected to a backrest driving component in the backrest.

9. The electric sofa anti-pinch system according to claim 2, wherein the drive module further comprises a third driving motor connected to a backrest driving component in a backrest.

10. The electric sofa anti-pinch system according to claim 1, further comprising an obstacle feedback module connected to the control module; the control module is further configured to control the obstacle feedback module to prompt a foreign object when the at least one moving part is controlled to stop operating or reversely operate through the drive module; wherein the obstacle feedback module comprises at least one of a buzzer, a vibrator, and an indicator light.

11. The electric sofa anti-pinch system according to claim 10, wherein the obstacle feedback module comprises the buzzer and a first transistor; one end of the buzzer is connected a first power signal, the other end of the buzzer is connected to a first pole of the first transistor, a control pole of the first transistor is connected to the control module, and a second pole of the first transistor is grounded.

12. The electric sofa anti-pinch system according to claim 1, wherein the electric sofa anti-pinch system further comprises a power module; the power module comprises a power conversion chip, an input terminal of the power conversion chip is connected to a first power signal, a ground terminal of the power conversion chip is grounded, and an output terminal of the power conversion chip is connected to the control module.

13. The electric sofa anti-pinch system according to claim 1, wherein the electric sofa anti-pinch system further comprises a sensor detection module; the sensor detection module comprises a first resistor, a second resistor, a third resistor, a first capacitor, and a first electrostatic protection diode; a first end of the first resistor is connected to an output terminal of the thin film pressure sensor or an output terminal of an infrared sensor, and a second end of the first resistor is respectively connected to a first end of the second resistor, a first end of the third resistor, and a first end of the first electrostatic protection diode; a second end of the second resistor is connected to a second power signal, and a second end of the third resistor is connected to the control module; a second end of the first electrostatic protection diode is grounded, and a first end of the first capacitor is connected to a second end of the third resistor, a second end of the first capacitor is grounded.

14. The electric sofa anti-pinch system according to claim 1, wherein the electric sofa further comprises a manual controller signal detection module; the manual controller signal detection module comprises at least one button signal detection unit corresponding to at least one function button provided in a manual controller; the button signal detection unit comprises a fourth resistor, a fifth resistor, a sixth resistor, a second capacitor, and a second electrostatic protection diode; a first end of the fourth resistor is connected to a function button corresponding to the button signal detection unit, and a second end of the fourth resistor is respectively connected to a first end of the fifth resistor, a first end of the sixth resistor, and a first end of the second electrostatic protection diode; a second end of the fifth resistor is connected to the control module, a second end of the sixth resistor is grounded, a second end of the second electrostatic protection diode is grounded, a first end of the second capacitor is connected to a second end of the fifth resistor, and a second end of the second capacitor is grounded.

15. The electric sofa anti-pinch system according to claim 1, wherein the electric sofa anti-pinch system further comprises a power module; the power module comprises a power conversion chip, an input terminal of the power conversion chip is connected to a first power signal, a ground terminal of the power conversion chip is grounded, and an output terminal of the power conversion chip is connected to the control module;

the electric sofa anti-pinch system further comprises a sensor detection module; the sensor detection module comprises a first resistor, a second resistor, a third resistor, a first capacitor, and a first electrostatic protection diode; a first end of the first resistor is connected to an output terminal of the thin film pressure sensor or an output terminal of an infrared sensor, and a second end of the first resistor is respectively connected to a first end of the second resistor, a first end of the third resistor, and a first end of the first electrostatic protection diode; a second end of the second resistor is connected to a second power signal, and a second end of the third resistor is connected to the control module; a second end of the first electrostatic protection diode is grounded, and a first end of the first capacitor is connected to a second end of the third resistor, a second end of the first capacitor is grounded;

the electric sofa further comprises a manual controller signal detection module; the manual controller signal detection module comprises at least one button signal detection unit corresponding to at least one function button provided in a manual controller; the button signal detection unit comprises a fourth resistor, a fifth resistor, a sixth resistor, a second capacitor, and a second electrostatic protection diode; a first end of the fourth resistor is connected to a function button corresponding to the button signal detection unit, and a second end of the fourth resistor is respectively connected to a first end of the fifth resistor, a first end of the sixth resistor, and a first end of the second electrostatic protection diode; a second end of the fifth resistor is connected to the control module, a second end of the sixth resistor is grounded, a second end of the second electrostatic protection diode is grounded, a first end of the second capacitor is connected to a second end of the fifth resistor, and a second end of the second capacitor is grounded.

16. The electric sofa anti-pinch system according to claim 1, further comprising a motor drive module corresponding one-to-one with the driving motor; the motor drive module comprises a motor drive chip, an input terminal of the motor drive chip is connected to the control module, and an output terminal of the motor drive chip is connected to a driving motor corresponding to the motor drive module.

17. The electric sofa anti-pinch system according to claim 16, further comprising a current acquisition module corresponding one-to-one with the motor drive module; the current acquisition module comprises a seventh resistor, an eighth resistor, and a third capacitor; a first end of the seventh resistor is connected to a ground terminal of the motor drive chip, a second end of the seventh resistor is grounded, a first end of the eighth resistor is connected to the ground terminal of the motor drive chip, a second end of the eighth resistor is respectively connected to a first end of the third capacitor and the control module, and a second end of the third capacitor is grounded.

18. The electric sofa anti-pinch system according to claim 1, wherein one squeezing risk area is corresponding provided with one triggering mechanism of the thin film pressure sensor;

wherein the triggering mechanism covers the squeezing risk area, the triggering mechanism is in a form of sheet, mesh, or grid; the triggering mechanism is configured to surround around an edge of the squeezing risk area, and the triggering mechanism is annular, U-shaped, or strip-shaped.

19. An electric sofa, comprising at least one moving part and the electric sofa anti-pinch system according to claim 1.

\* \* \* \* \*